May 26, 1970
M. S. CORNETT
3,513,642
CENTRIFUGAL DUST SEPARATOR
Filed July 25, 1968
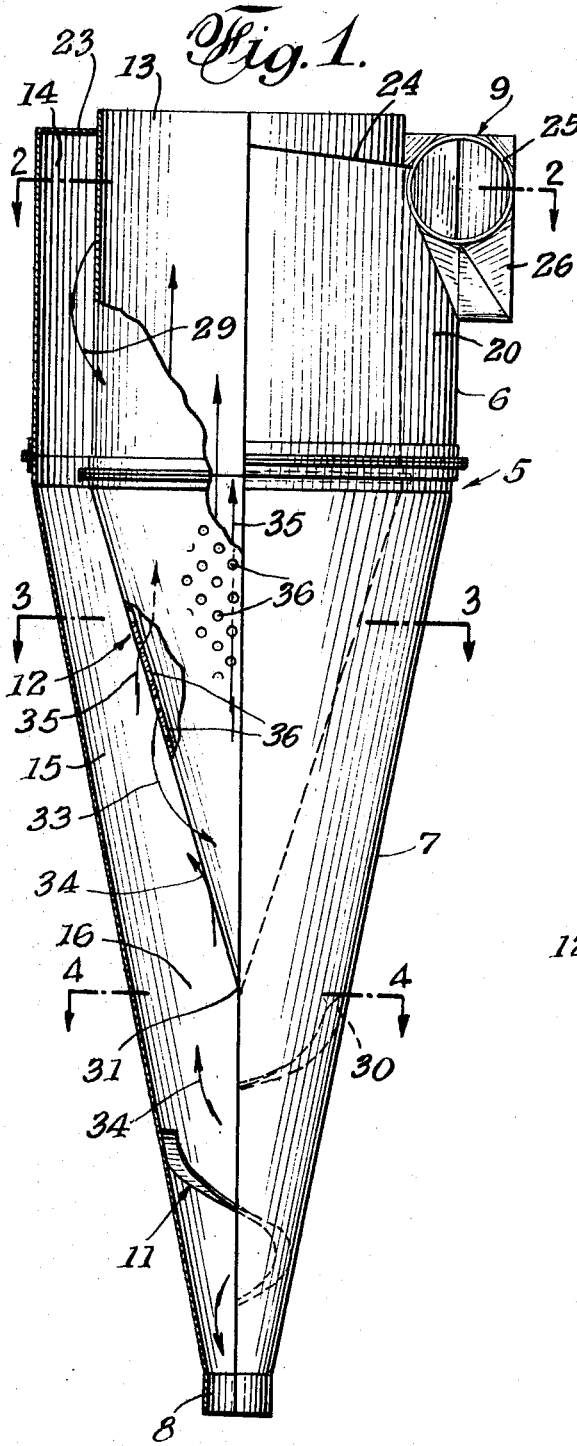
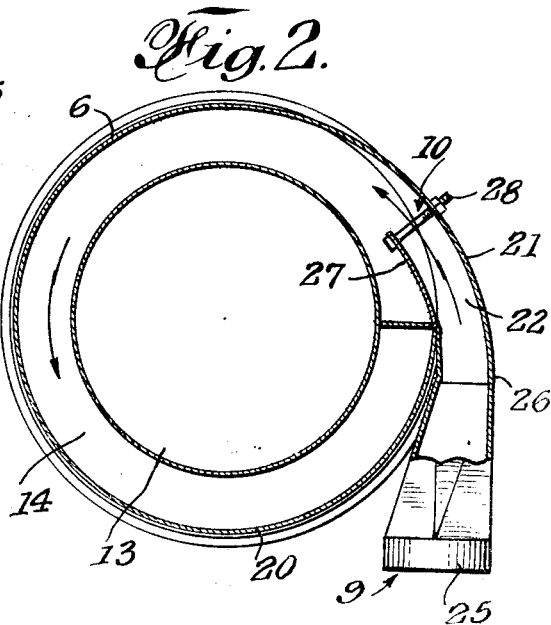
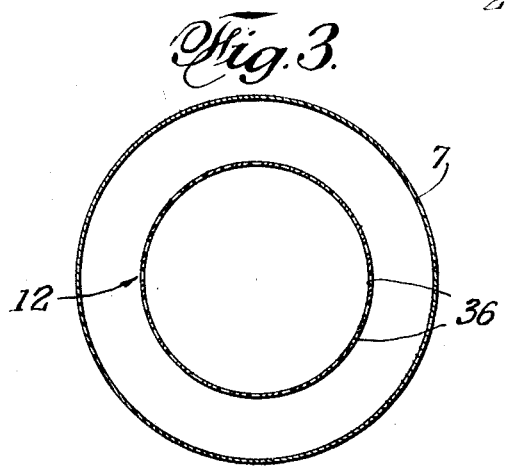
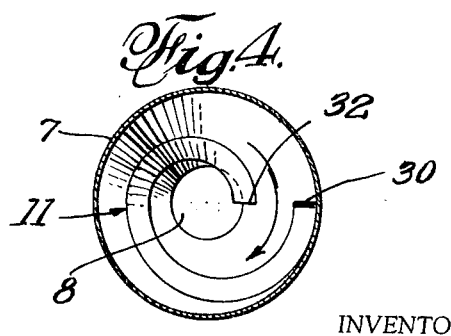
INVENTOR.
MILAN S. CORNETT
BY
ATTORNEY

# United States Patent Office 3,513,642
Patented May 26, 1970

3,513,642
CENTRIFUGAL DUST SEPARATOR
Milan S. Cornett, 1322 Wake Forest Drive,
Walnut, Calif. 91789
Filed July 25, 1968, Ser. No. 747,592
Int. Cl. B01d 53/24
U.S. Cl. 55—399      4 Claims

ABSTRACT OF THE DISCLOSURE

A vertically disposed housing having an upper, tangential inlet for a dust-laden air flow and having a velocity-adjusting throat, and with a reducingly conical lower portion leading to a dust discharge at the lower end smaller than the inlet, a helical baffle skimmer in the lower interior of the conical portion, a concentric conical screen within the upper interior of the mentioned conical portion above the baffle, for intercepting dust in a reverse dust-laden flow, rising from the baffle, and passing the air of the latter flow for discharge upwardly.

BACKGROUND OF THE INVENTION

Field of the invention

Separating dust or other particles from an air flow under pressure to provide a clean air discharge and diversion of the dust or particles to storage or disposal. Wood and lumber mills are examples of installations requiring separators according to this invention.

SUMMARY OF THE INVENTION

This invention comprises, generally, a vertically disposed housing 5 formed of an upper cylindrical part 6 and a lower conically converging housing part 7 terminating in a reduced outlet 8 for dust separated from a centrifugally and helically moving dust-laden air flow, a tangential inlet 9 to the housing part 6 for such dust-laden air flow, means 10 to regulate the velocity of the flow, thereby controlling the amount of air escaping with the dust that is discharged through the outlet 8, a helical baffle skimmer 11 mounted on the inner surface of the conical housing part 7 in the lower portion thereof to guide movement of the dust in the flow downwardly toward the discharge 8, an inner perforated screening cone 12 concentric with the upper portion of the converging part 7, with the apex thereof on an approximate level with the upper end of the baffle 11 and extending upwardly to an upwardly directed tubular air-discharging part 13 that cooperates with the housing part 6 to form an annular passage 14 in which the dust-laden air flow moves, and said annulus extending downwardly to a diverging frusto-conical passage 15 defined between the housing part 7 and the screening cone 12, the helix-provided lower portion of the latter housing part being constricted in size in relation to the size of the passage in the inlet 9 and of the dust-laden air passage 16 at the mentioned level in the conical housing part 7 at the apex of the screen, thereby creating a back pressure in the flow that causes an upward movement of air within the convolutions of air flow in the conical passage 15. The dust carried by the upwardly moving air is intercepted by the conical screen while the resultant clean air passes through the screen orifices and upwardly outwardly through the outlet 13.

An object of the present invention is to provide a centrifugal air separator embodying the features and organization above generally described.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

BRIEF DESCRIPTION OF THE DRAWING

In the drawing, like reference characters designate similar parts in the several views.

FIG. 1 is an elevational view, partly in quarter section, of a centrifugal dust separator according to the present invention.

FIGS. 2, 3 and 4 are cross-sectional views taken, respectively, on the planes of lines 2—2, 3—3 and 4—4 of FIG. 1.

DESCRIPTION OF THE PREFERRED EMBODIMENT

The air-discharging cylindrical part 6 of the housing 5 is formed to have a cylindrical wall 20, the upper portion of which is formed to have an involute portion 21 that defines a passage or throat 22 opening tangentially into the mentioned annulus 14. The air-discharging part 13 extends preferably coaxially through the part 6 and a cover plate 23 encloses the top of the annulus 14. Said cover plate is ring-shaped and preferably slopes, as at 24, around the part 13, from the involute wall portion 21 and around said part 6 toward the passage 22.

The inlet 9, as best seen in FIGS. 2 and 3, extends forwardly from the passage 22 and is formed to have an areal size that is approximately the same from its circular inlet 25 to the rectangular form thereof at the portion 26 which connects to the passage 22.

The regulating means 10 is located to control the areal size of the passage 22 beyond the point of its connection to the inlet portion 26. Said means 10 comprises a hinged or otherwise movable vane 27 that, by manipulation of an adjusting screw 28, enlarges or contracts the size of passage 22 relative to the areal size of the inlet 9, thereby increasing or decreasing the velocity of the flow of dust-laden air directed into the mentioned annulus 14. Such air will be given a downwardly spiraling movement by the sloping cover plate 24, as suggested by the arrow 29, it being understood that the speed of the air flow will be such as to produce a centrifugal force such that the helical movement would be downwardly along the inner face of the part 6. The end of the annulus remote from the throat is closed, as shown in FIG. 2.

The baffle or skimmer 11 comprises a helical strip affixed to the inner face of the conical part 7 in the lower portion thereof, as shown, with the upper end 30 being approximately at the level of the apex 31 of the conical screen 12 and the lower end 32 terminating at or adjacent the outlet 8 of the housing 5. Said helix 11 may be right- or left-hand and is preferably of the hand of the convolutions of the dust-laden air, starting as in the direction of arrow 29 and continuing in the conical passage 15 formed between the housing part 7 and the screen 12, as suggested by the arrow 33. This flow of dust-laden air will also, by reason of the convergence of the housing part 7, as well as the centrifugal force of the flow, cause the flow to crowd the inner face of said part and in a helical path that is intercepted by the helix 11. As a result of such a flow, the area of the passage immediately around the conical screen will be under lower pressure than is the mainstream of the flow, which centrifugally hugs the housing part 7.

The helical, outwardly crowding flow of air and dust will encounter the helix 11, which has the dual purpose of skimming dust out of said flow and forcing such dust downwardly toward the outlet 8, which has an areal size smaller than that of the inlet 9, preferably about one-quarter of the latter's area.

The reducing portion of the housing part 7 occupied by the helix, together with the relatively small area of the outlet 8, creates a back pressure in said housing portion which slows the discharge at outlet 8. As a result, the pressure of the inlet flow which cannot reach the outlet 8 will seek another outlet, which is the upper opening of the cylindrical part 13. The air in the area around the screen 12, being air that has largely given up the dust therein to the skimmer baffle 11, therefore moves in the direction of the arrows 34, in an upward flow around the outer surface of said screen and, in the direction of the arrows 35, through the orifices 36 in said screen, and thence upwardly outward through the part 13. In practice, the number and size of the perforations of the screen, i.e., the total area of such openings, should be approximately equal to or preferably larger than the area of the part 13. As to orifice size, an air stream carrying finer dust particles requires such size to be smaller than for a stream laden with coarser dust particles.

As best seen in FIG. 1, the passage 15, as the same converges, increases in cross-sectional size, thereby having a generally uniform flow size to where the same terminates at the passage 16. From this point downwardly, the air passage reduces in size to create the back pressure above mentioned.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A centrifugal dust separator comprising:
   (a) a vertically disposed housing having an upper cylindrical part provided with a cover and a lower frusto-conically converging part terminating in a reduced outlet,
   (b) a tangential inlet to said upper part for a dust-laden air flow under pressure, said inlet being substantially larger than the reduced outlet,
   (c) a tubular member concentrically disposed within the upper part of the housing and extending upwardly through the cover of said upper part and forming an annular passage open to said inlet,
   (d) means to regulate the size of the inlet to said passage to regulate the velocity of the flow into the annular passage,
   (e) a conical screen having its upper end substantially on the level of the upper end of the frusto-conically converging part and extending downwardly from the tubular member, spaced from the frusto-conically converging part of the housing to define a diverging frusto-conical passage extending downwardly from the mentioned annular passage, the apex of the conical screen being located in upwardly spaced relation to said reduced outlet and terminating at the mentioned apex, the portion of the frusto-conically converging part of the housing below said apex defining a conical extension of said diverging frusto-conical passage, and
   (f) a helical baffle skimmer affixed to the inner face of the latter portion of said frusto-conically converging housing part to intercept dust in the flow from the diverging frusto-conical passage and to direct such dust and a portion of the air in the flow to the reduced outlet, the remaining portion of the air in the flow escaping through the screen upwardly outwardly from the upper end of the tubular member,
   (g) a throat being formed where the air inlet joins the annular space between the cylindrical upper housing part and the mentioned concentric tubular member, said space being closed at the end thereof that is remote from the throat, and
   (h) the velocity-regulating means comprising:
      (1) a movable portion of said housing part located between the housing part and the tubular member and defining the inner side of the throat, and
      (2) adjusting means for said member extending from said movable portion and connected to a portion of the inlet on the outer side of the throat.

2. A centrifugal dust separator according to claim 1 in which the cover on the upper part of the housing, from the inlet, is disposed on a downward slope to guide the air flow in a downward helical path in the annular space.

3. A centrifugal dust separator according to claim 1 in which the diverging frusto-conical passage increases in cross-sectional size toward the apex of the screen.

4. A centrifugal dust separator according to claim 3 in which the inlet is approximately four times as large as the reduced outlet.

References Cited

UNITED STATES PATENTS

| 1,029,214 | 6/1912  | Morse         | 55—418  |
| 1,055,792 | 3/1913  | Plock         | 55—435  |
| 770,582   | 9/1904  | Hollingsworth | 55—459  |
| 1,267,715 | 5/1918  | Tutwiler      | 55—418  |
| 2,010,128 | 8/1935  | Arnold        | 55—399  |
| 2,222,930 | 11/1940 | Arnold        | 55—339  |
| 2,568,032 | 9/1951  | Stephanoff    | 55—459  |
| 2,788,087 | 4/1957  | Lenehan       | 55—392  |
| 3,010,579 | 11/1961 | Duesling      | 209—211 |
| 3,061,098 | 10/1962 | Brezinski     | 55—459  |
| 3,162,518 | 12/1964 | Thomas et al. | 55—459  |
| 3,362,140 | 1/1968  | Mott          | 55—459  |
| 3,413,776 | 12/1968 | Vytlacil      | 55—459  |

FOREIGN PATENTS

| 12,364    | 4/1934 | Australia. |
| 1,257,689 | 2/1961 | France.    |

HARRY B. THORNTON, Primary Examiner

B. NOZICK, Assistant Examiner

U.S. Cl. X.R.

55—418, 459; 209—144